United States Patent [19]
Horwitz

[11] 3,841,178
[45] Oct. 15, 1974

[54] FIXTURE AND METHOD FOR REPAIRING A WORN BALL ON THE YOKE OF A UNIVERSAL JOINT ASSEMBLY

[75] Inventor: Don A. Horwitz, Skokie, Ill.
[73] Assignee: Wesco Products Company, Chicago, Ill.
[22] Filed: July 9, 1973
[21] Appl. No.: 377,788

[52] U.S. Cl............ 82/34 R, 82/45, 269/47, 269/165, 269/243, 29/401
[51] Int. Cl............................................ B23b 5/00
[58] Field of Search ........ 82/34 R, 45; 269/47, 165, 269/243, 245

[56] References Cited
UNITED STATES PATENTS
1,178,277  4/1916  Torgerson........................... 82/34 R
1,691,320  11/1928  Whitcomb........................... 82/34 R

*Primary Examiner*—Leonidas Vlachos
*Attorney, Agent, or Firm*—Kegan, Kegan & Berkman

[57] ABSTRACT

A special fixture and a method by means of which a worn or damaged ball on the yoke of a universal joint assembly may be machined to provide a stub shaft on which a cooperating sleeve or cap element is secured to simulate a new ball. The transformation is effected with an avoidance with any major rebuilding, and the need for welding is obviated.

5 Claims, 8 Drawing Figures

PATENTED OCT 15 1974                3,841,178
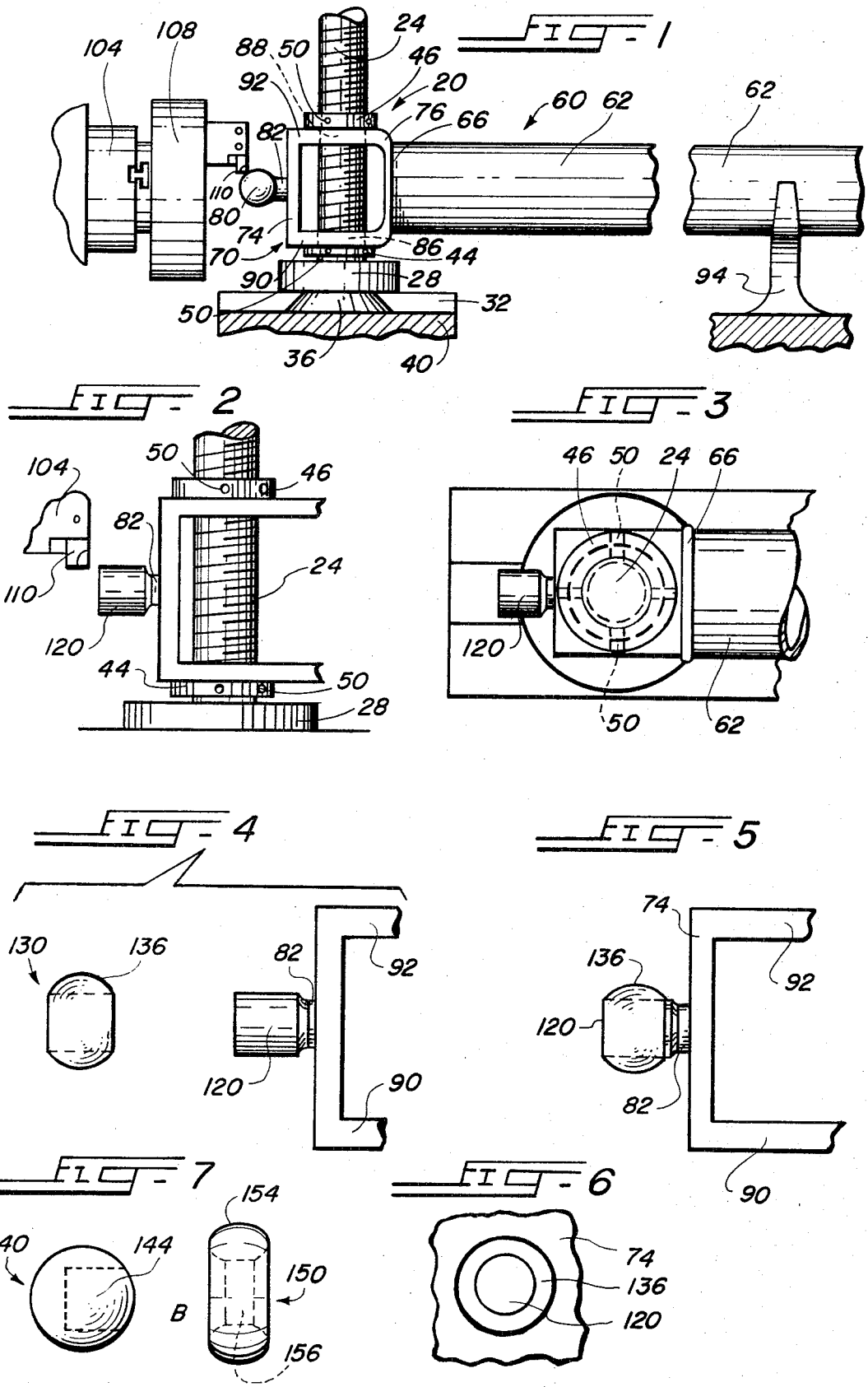

FIXTURE AND METHOD FOR REPAIRING A WORN BALL ON THE YOKE OF A UNIVERSAL JOINT ASSEMBLY

The present invention relates generally to an improved apparatus and technique for the repair and reconditioning of an end structure in automobile drive shafts and associated universal joint assemblies. More particularly, the invention is directed to apparatus and techniques for repairing a worn or damaged ball of a ball coupling secured to the yoke of a universal joint assembly. In the specific type of equipment contemplated, the yoke of the universal joint is permanently secured to or an integral component of an automobile drive shaft and the ball is integrally formed with the yoke at a wall opposite the one to which the drive shaft is secured. The yoke-carried ball seats into a cooperating socket, not shown, carried by a structure not involved in the present invention.

Many types of universals or universal joint assemblies are known in the prior art. The present invention is directed specifically to that type of universal in which the yoke or housing of the cross element is fabricated with a permanently secured ball element projecting outwardly of the yoke. At an opposite wall of the yoke the drive shaft itself is permanently attached. This type of structural configuration is commonly used in constant velocity universals. When it becomes necessary to replace the cross element of the universal in structures of the type described, the procedure employed is conventional, and can be carried out with minimum expense and delay. However, when the ball which is attached to the wall of the yoke wears or is damaged, the fact that it is a machined part of a unitary casting "integral" with the yoke of the universal as well as with the drive shaft, has necessitated that the entire assembly be discarded and replaced, and an entirely new assembly installed. The "repair" has been a very costly procedure necessitated through the failure or wear of a small and relatively inexpensive mechanical part. It is to the solution of this problem that the present invention is directed.

It is, accordingly, the aim of the present invention to provide apparatus and an improved method whereby the worn or damaged ball may be refurbished or "rebuilt" to provide an effective and low-cost replacement constituting the full functional equivalent of the original structure. The original drive shaft and associated yoke are retained.

It is a principal object of the invention to provide a fixture whereby the yoke of a universal joint assembly, and its associated structure, may be supported on the bed of a lathe or similar machine so that a worn or damaged ball element carried by the yoke may be subjected to machine operations as a workpiece.

It is a related object of the invention to provide a fixturn attachable to the bed of a lathe and which is effecive to hold a universal joint yoke fixed in place while a damaged or worn ball attached to the yoke is cut by means of a tool carried in a rotatable head of the machine.

A further object of the invention is to provide a fixture and technique whereby a worn or damaged ball constituting a part of or attached to the yoke of a universal assembly may be machined and thereby converted to a stub shaft.

A related object of the invention is to convert a worn ball or damaged ball of a ball and socket joint assembly into a stub shaft and, thereafter, impressing on the shaft a cooperating auxiliary component to convert the shaft into a simultated "ball".

It is an important feature of the invention that the repair of a worn or damaged ball may be effected utilizing a relatively small lathe, since the yoke and its associated drive shaft are held fixed with reference to the lathe, while a tool-carrying head of the lathe is utilized to machine the ball to remove the worn and damaged parts.

Still another object of the invention is to provide a simple fixture whereby the yoke of a universal assembly may be accurately and easily positioned vertically and horizontally with respect to a reference center correlated with a machine tool operated on a lathe.

It is, generally, the object of the present invention to provide an improved tool and apparatus which will eliminate any necessity for costly discarding of major assemblies as a result merely of the need to repair or replace a small component of such an assembly.

Other and further objects, aims and advantages of the invention will become apparent from a reading of the following specification taken in conjunction with the drawing in which:

FIG. 1 is a front elevational view of a preferred embodiment of the fixture of the invention secured to the bed of a lathe and supporting the yoke of a universal joint assembly with its associated drive shaft and ball element, with the cutting tool of the lathe in a position to operate on the ball;

FIG. 2 is an enlarged, fragmentary front elevational view showing the fixture of the invention supporting the yoke of the universal joint and with the ball machined to remove the worn or damaged portion;

FIG. 3 is a top plan view of the structure shown in FIG. 2;

FIG. 4 is an exploded, fragmentary view of a ring adapted for securement on the stub shaft to provide a simulated ball;

FIG. 5 illustrates the ring as applied to the stub shaft to provide the final ball-like structure;

FIG. 6 is an end view taken substantially on the line 6—6 of FIG. 5; and

FIGS. 7A and 7B show alternate forms of a ball element to be fastened to the stub shaft shown in FIG. 2 or FIG. 4.

Referring now to the drawing, and particularly to FIG. 1, for purposes of illustrative disclosure, a preferred embodiment of one form of the invention is shown as a fixture 20 consisting of a threaded shaft 24 secured to and extending upwardly of a base 28 fastened in turn to a block 32 adapted for securement to a transversely and longitudinally shiftable carriage 36 supported on a lathe bed 40.

In the preferred embodiment of the apparatus shown, the shaft 24 of the fixture 20 is threaded and is provided with a pair of cooperating locking rings 44 and 46 each threadedly engaged on the shaft 24 and including set screws 50 which may be tightened to lock the respective rings at any selectable positions along the length of the shaft 24. The role of the locking rings or collars 44 and 46 is explained more fully below.

The fixture 20 is adjustable for transverse and longitudinal positioning on the lathe and the shaft-carried structure is shiftable to selectable positions vertically at any of which positions it can be held secured in place by means of the locking collars 44 and 46. Such a functional arrangement is illustrated in FIGS. 1 and 2. As shown, a drive shaft assembly 60 consisting of a tube or pipe 62 is connected by a weld bead 66 to a universal yoke or housing 70. At its wall 74 opposite the wall 76 of the yoke 70 to which the tube 62 is attached is an outwardly projecting ball 80 permanently fastened to the wall 74 through a boss 82.

As conventionally employed in the power train of the vehicle in which the drive shaft and the associated universal assembly described are used, the yoke 70 includes a cross type universal joint element (not shown) a pair of opposed ends of which are received in and retained in aligned circular openings 86 and 88 formed in the lower wall 90 and the upper wall 92 of the yoke 70. For the purpose of effecting the repair which is the substance of the subject invention, the cross or spider is removed so that the yoke housing is empty and the holes 86 and 88 in the lower and upper walls 90 and 92 are accessible. The manner in which the yoke is placed on and secured to the shaft 24 of the fixture 20 will now be understood. With the fixture 20 mounted on the lathe bed 40, and with the collar 44 in place but the collar 46 removed, the yolk 70 with its associated drive shaft and ball structure is positioned on the shaft 24 of the fixture 20 so that the shaft projects through the opposed openings 86 and 88 in the yoke walls 90 and 92. Preferably and conveniently the diameter of the shaft is such that it is only slightly less than that of the opening through which it projects. With the yoke 70 positioned on the shaft 24, the collars 44 and 46 are adjusted to position the yoke at the desired vertical height and then locked by tightening the set screws 50. The assembly is stabilized and the torsion effect minimized by supporting the far end of the shaft 62 on a V-formed or U-formed bracket 94, as indicated schematically in FIG. 1.

In preparing the assembly for machining of the worn ball 80, the yoke is located transversely of the bed of the lathe to establish the ball on a live center line of the lathe. As shown in FIG. 1, a rotatable chuck 104 of the lathe carries a tool holder 108 in which there is secured a cutting tool 110. The lathe controls are manipulated and adjusted in the conventional manner so that the tool is brought into cutting engagement against the worn ball 80 to remove peripheral stock and to convert the ball into a stub shaft 120 as indicated in FIGS. 2 and 3, the final diameter of the stub being machined to the desired value.

The "repair" operation is completed, as illustrated schematically in FIGS. 4 and 5, by sliding onto the stub shaft 120 a sleeve-like ring 130 having an axial opening corresponding in size to the diameter of the stub shaft 120. In a preferred embodiment of the invention the relative sizing of the shaft 120 and the ring or sleeve 130 is that frictional securement is effected when the sleeve is forcibly driven onto the stub shaft, as indicated schematically in FIG. 5.

In the embodiment of the sleeve or ring 130 shown in FIGS. 4 and 5, the structure is essentially a bilaterally truncated sphere whose outer diameter corresponds to the diameter of the ball 80 in its original state. The arcuate extent or expanse of the annular surface 136 of the sleeve 130 is sufficient to provide the required surface area of engagement with the internal surface of the cooperating socket (not shown). In all material functional aspects, the composite "ball" formed by the stub shaft 120 and its encircling ring 130 is the equivilent of the original ball 80.

FIGS. 7A and 7B illustrate alternative preferred embodiments of sleeve-like rings suitable for use in accordance with the practice of the invention. In FIG. 7A the ring 140 takes the form of a ball which has been provided with a socket 144 generally cylindrical in internal contour and having an internal diameter corresponding essentially to the diameter of the stub shaft 120. The ring 150 shown in the FIG. 7B may be described as a ring of generally toroidal form, the curvature of the outer periphery 154 of which corresponds to the arcuate curvature of the original ball 80. Again, the diameter of the cylindrical hole 156 or center portion of the ring 150 corresponds essentially to, but is not less than, the diameter of the stub 120.

While preferred methods and preferred commercial embodiments of the fixture of the invention and sleeves have been illustrated and described, it is understood that the same are capable of modification and that such modifications may be made without departure from the spirit and scope of the invention as defined in the appended claims.

What is claimed is:

1. A lathe fixture for supporting and securing the yoke of a universal joint of the type including a ball joined to and projecting axially endwise of the yoke, said fixture being adapted for presenting the ball to a tool operable to cut the ball for reshaping thereof, said fixture comprising, in combination, a base adapted for supported securement on the bed of a lathe-like machine for selectable positioning of the yoke of the universal joint transversely of and longitudinally along the machine in paths normal to and paralleling a way-like carriage thereof, a shaft carried by and extending upwardly of said base and normally of the carriage of the machine, said shaft being sized to pass through a pair of opposed openings formed in upper and lower walls of the yoke of the universal joint and to limit shifting thereof in horizontal planes, yoke locking means carried by said shaft and shiftable axially thereon to abut the yoke at upper and lower walls thereof and to support the yoke at selectable axial positions on said shaft and to preclude vertical displacement of said yoke, whereby a cutting tool carried by a rotatable head of the machine is presentable to the ball to remove stock therefrom to convert the ball to a stub shaft generally cylindrical in form and coaxial with an axial centerline of the yoke.

2. The fixture as set forth in claim 1 and further comprising external screw thread means carried on said shaft along the length thereof, and wherein said yoke locking means comprises a pair of ring-like collars having internal thread means for threaded coupling of said collars with said shaft for rotatable travel axially therealong, said collars being positionable one below and one above said yoke on said shaft for stressed abutment thereagainst on opposed sides of said yoke thereby to hold the yoke as selectable vertical positions along said shaft correlated with an operative position of a cutting tool to be presented to the ball of the yoke for reshaping thereof.

3. The fixture as set forth in claim 2 and further comprising means for releasably locking said collars at selectable positions on said shaft to obviate axial shifting on said collars therealong.

4. The fixture as set forth in claim 3 wherein said means for releasably locking said collars on said shaft comprise set screws threaded in and extending radially inwardly of said collars and advancable stressingly to engage said shaft to lock said collars thereon.

5. The structure as set forth in claim 1 wherein a drive shaft is fastened to and extends axially of the yoke, and further comprising support means cooperating with said fixture to support said drive shaft at an end thereof remote from said yoke.

* * * * *